United States Patent Office 3,398,093
Patented Aug. 20, 1968

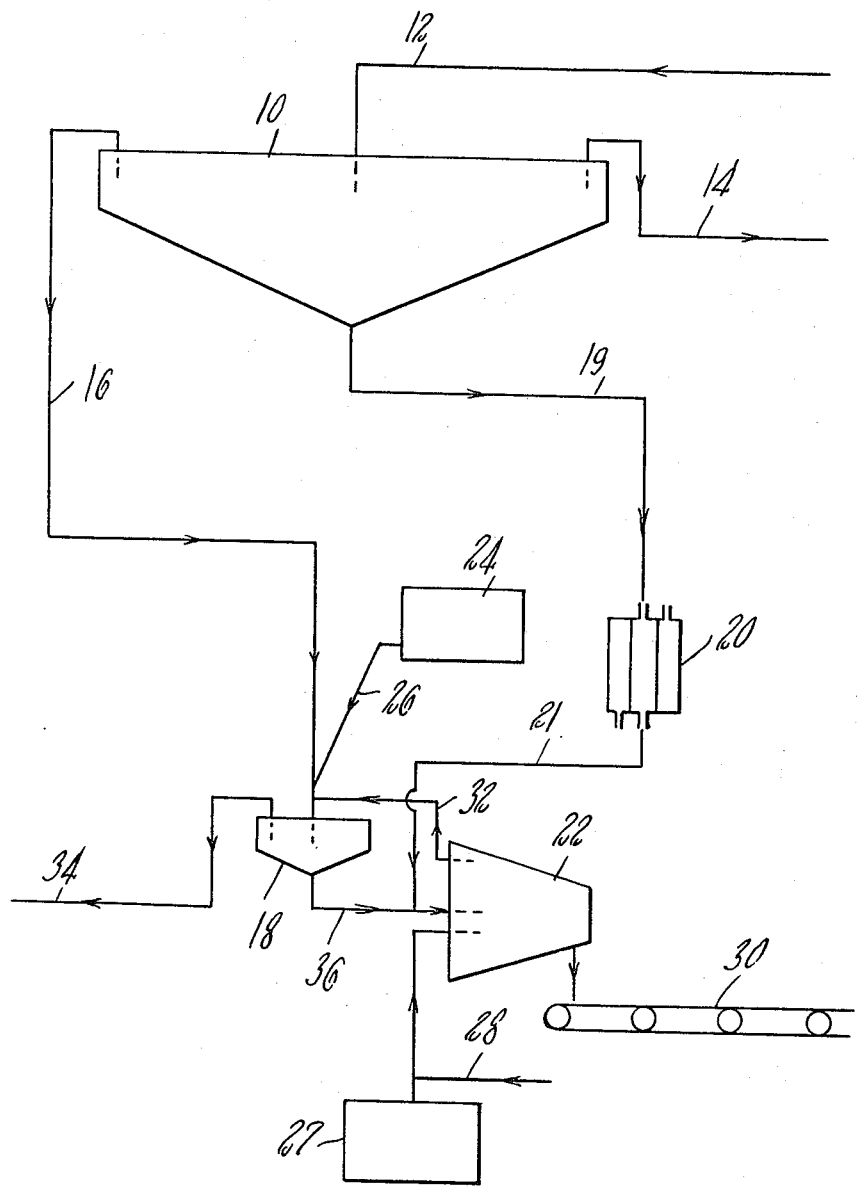

3,398,093
PROCESS FOR SEPARATING SOLIDS FROM
LIQUID SUSPENSIONS THEREOF
Francis X. Ferney, Walpole, Mass., assignor to Bird
Machine Company, Walpole, Mass., a corporation
of Massachusetts
Filed June 17, 1965, Ser. No. 464,745
8 Claims. (Cl. 210—54)

ABSTRACT OF THE DISCLOSURE

In a process of separating solids from liquid, primary stage separation is carried out without removing from the effluent a solids fraction which requires chemical addition for removal and which does not interfere with recirculation and re-use of the effluent. A portion of this effluent constituting the major part of the liquid entering the primary stage is recirculated for re-use. The remainder of the liquid is treated to remove this solids fraction, as may be required for disposal, in secondary stage separation by feeding the underflow from the primary stage to a centrifuge, feeding the remainder of the primary stage effluent to another secondary stage separator in which chemical is added and from which the underflow is also fed to the centrifuge, and by adding chemical to the feed to the centrifuge.

---

This invention relates to a process for separating solids from liquid suspensions thereof in which a chemical reagent is used to increase the separation of fine solid particles, and more particularly to such a process in which the separation or "de-watering" involves centrifuging of the thickened underflow from a preceding thickening stage.

Many liquids-solids separating plants are designed to effect separation in several stages, a primary stage in which most of the water is removed and a secondary stage in which the underflow from the primary stage is further thickened to the desired extent for product recovery. The overflow from the primary stage is normally recirculated in substantial part to an earlier stage of processing in the plant, such as flotation, washing, etc., which is the source of feed to the primary stage. However there is usually considerably more water in the overflow from the primary stage than can be recirculated due to additional water entering the circuit from other sources such as gland water for pumps, and this excess water must be disposed of.

Particularly in recent years there has been much emphasis laid on designing such dewatering systems for maximum solids recovery in the underflow from the primary stage. This has been in part from the desire to increase the solids output of the system where these are useable but is probably more due to the need for reducing the solids content of the primary overflow to a negligible amount so that stream pollution by the discarded fraction of that overflow will be avoided. Thus it is common to use in the primary stage one or more large capacity thickeners and to add to the feed thereto or therein substantial quantities of chemical reagent such as a flocculant to increase the percentage of solids settling into the underflow. With such systems high clarity overflows are obtainable, containing a negligible amount of solids, of the order of 0.001% or less.

Clarification of the primary overflow to such an extent is very expensive and may have as its only justification avoidance of stream pollution by the discarded fraction of the overflow. For example, such clarification of the overflow faction which is recirculated is generally unnecessary. In many systems as much as 0.1 to 0.2% or more solids can be tolerated in the recycled overflow and such clarifications are usually obtainable with smaller, less complicated clarifying equipment and without the use of chemicals. Even where the solids recovered are useable, the increased amount thereof recovered in clarifying to negligible solids content will seldom offset the cost of doing so.

The object of this invention is to provide a simpler, less costly and more efficient process for utilizing chemical agents in conjunction with dewatering equipment in plants wherein a major part of the overflow from a primary stage of dewatering may be recirculated and a second portion of said overflow requires clarification to a substantially greater extent than the recirculated portion. In such cases, my invention makes it possible to provide the required clarification and maximum solids recovery with less expensive equipment and with much less chemical reagent than has previously been required.

The invention utilizes in a primary stage a clarifier (one or more) which may be of any suitable type such as a settling tank or a centrifuge in which the greater part of the water is removed. The clarification in the primary clarifier produces an effluent which has a solids content suitable for the recirculated portion but substantially above that required for the second portion. This second portion requiring greater clarification is fed to a small thickener or settling tank in a secondary clarifying and recovery stage which also comprises a centrifuge, the centrifuge being preferably of the solid bowl continuous type of a capacity to process the underflows from both the primary clarifier and the settling tank and equipped for the addition of chemical reagent to the slurry after it has entered the bowl. The secondary settling tank is preferably in close association with the centrifuge, the tank being arranged for gravity feed of its underflow to the centrifuge or to the underflow from the primary clarifier as it is fed to the centrifuge. Chemical reagent for promoting solids separation, such as a flocculant, is added to the slurry treated in the secondary settling tank, which may include effluent recirculated from the centrifuge, and is also added to the feed to the centrifuge, preferably after it has entered the bowl.

This process has many advantages over the prior practice previously described. Clarification of the primary stage effluent only to a degree suitable for recirculation ordinarily will not require the use of a chemical reagent and may be effected with smaller and less complicated and expensive equipment, the savings in which may be sufficient to more than offset the additional cost of the small settling tank in the secondary stage. Much greater savings in amount of chemical reagent required are obtained than might be expected. It is of course evident that substantially less quantity of slurry is chemically treated in my process because the untreated recirculated primary stage overflow fraction ordinarily is the greater part of the incoming feed. It might be expected, however, that it would require approximately the same amount of chemical to remove the same amount of solids in the secondary stage.

That such is not the case is due primarily to the phenomenon that solid particles chemically flocced or agglomerated in a primary stage and fed to a centrifuge are not separated therein satisfactorily without the addition of substantially more chemical, even more than was required to separate the same solids initially. Apparently, the friction and shear forces to which the slurry is subjected in being fed to the centrifuge, such as result from pumping the slurry through long pipelines and accelerating it to bowl speed in the centrifuge, produce substantial redispersion of the flocced solids component.

Moreover, mechanically redispersed chemically flocced solids seem to be substantially more resistant to re-agglomeration, at least with the same chemical reagent.

In my process this troublesome effect is reduced to negligible proportions. The flocced underflow from the secondary tank is a small proportion of the centrifuge feed and in the preferred arrangement it is not subjected to substantial friction and shear forces other than produced in the acceleration to bowl speed. In the preferred form also the chemical reagent is added to the slurry in the centrifuge after it has been accelerated to bowl speed, so that no friction and shear forces are present to break up the formed agglomerates. In this manner savings of at least fifty percent of the amount of chemical agglomerating agent required as compared with the prior practice are often obtainable.

Another important advantage of my process is that the secondary settling tank and the centrifuge are small enough to be readily housed within the plant whereas primary stage classifiers are frequently so large that they are located outdoors. Chemical reagents of the type involved generally are substantially more effective at room temperature or somewhat above than at lower temperatures. Hence with my process it is feasible to carry out the chemical treatment at closely controlled warmer temperature which is not feasible in many cases with the prior practice, particularly in cold weather climates.

The single figure of the accompanying drawing is a flow sheet diagrammatically illustrating a solids recovery or dewatering system suitable for the practice of the process of my invention in its preferred form.

Referring to the drawing, the primary thickener is shown at 10 which is fed with solids suspension to be treated through a pipeline 12. Thickener 10 may be any usual make of clarifier which may be sized and equipped to produce an overflow suitable for recirculation to a preceding process which is the feed source rather than to produce maximum consistency of solids in the underflow. A portion of this overflow is recirculated to a preceding process which is the feed source through pipeline 14. The remainder of the overflow from thickener 10 is fed through pipeline 16 to a secondary and much smaller clarifier or settling tank 18 while the underflow from thickener 10 is fed through pipeline 19, heat exchanger 20, and pipeline 21 to a centrifuge 22 indicated as the solid bowl continuous type. No means are shown for supplying agglomerating chemical or flocculant to the feed to or in the primary thickener and ordinarily no addition of such chemical at this stage will be required, or be advantageous. It will be understood, however, that the invention does not exclude some addition of such chemical at this stage for in certain cases the invention may be effective substantially to reduce the amount of, without entirely eliminating, such chemical addition at this stage.

Chemical reagent for promoting solids separation is supplied to the feed pipeline 16 to settling tank 18 from a source tank 24 through pipeline 26. Such reagent is also supplied to the feed to centrifuge 22 from a source tank 27 through piping 28 which is also connected to a source of dilution water and which, in accordance with the preferred process, extends into the centrifuge and discharges to the feed slurry after it is in the centrifuge bowl. The solids recovered in the centrifuge cake are discharged to conveyor 30 while the centrifuge effluent is returned to the feed to settling tank 18 through pipeline 32. The overflow from clarifier 18 is discharged through pipeline 34. Its underflow is discharged by gravity to the centrifuge feed pipeline 21 through piping 36.

The temperature of the slurry during its exposure to chemical reagent is preferably at least at room temperature and more desirably at about 100° to 150° F., or higher. Heat exchanger 20 is provided to heat the incoming centrifuge feed to any extent necessary to provide the desired temperature. A heat exchanger may also be provided in feed line 16 to the secondary settling tank 18 but this is not shown since the amount of chemical needed to treat this part of the slurry is relatively small and the advantages of warm temperature would usually not offset the costs of heating.

Any chemical reagent may be used which is effective to promote solids recovery in the particular slurry being processed. Usually these will be polyelectrolytes, which may be of the anionic, cationic or non-ionic types. Such polyelectrolytes are commercially available from various sources, examples being those sold by Nalco Chemical Company of Chicago, Ill. under the tradename "Nalco", such as Nalco 1782, anionic, Nalco 600, cationic and Nalco 670, non-ionic, and those sold by Dow Chemical Company of Midland, Mich. under the tradename "Purifloc", such as Purifloc A–21, anionic, Purifloc C–31, cationic and Purifloc N–11, non-ionic.

The process has many useful applications to the separation of solids from suspensions of various types and concentrations, as will be appreciated. In the following example, selected for illustration, the process is used for the separation of the solids portion of the tailings from bituminous coal flotation cells.

Example

The flotation tailings, at a solids content of about 2 to 3%, are fed to primary clarifier 10 at a rate of about 1600 g.p.m. The overflow from this clarifier has a solids content of about 0.1 to 0.2%. About 1250 g.p.m. of this overflow are recirculated to the flotation plant and the remainder thereof, about 250 g.p.m., is fed to secondary clarifier 18. The underflow from the primary clarifier, having a solids content of about 30 to 40%, is fed to centrifuge 22 through pipeline 20 at about 100 g.p.m. The overflow from secondary clarifier 18 has a solids content of about 0.001% or less, and is discharged through pipeline 34 at about 340–345 g.p.m. The underflow from secondary clarifier 18 has a concentration of about 10 to 20% solids and is discharged to the centrifuge feed through pipeline 26 at a rate of about 5 to 10 g.p.m. The effluent from centrifuge 22 is returned through pipeline 32 to clarifier 18 at about 100 to 110 g.p.m. The approximately dry solids cake is discharged from the centrifuge at about 35 to 50 g.p.m. Dilution water is added with the chemical reagent in the centrifuge in amount approximately equal to the solids discharge rate. A flocculant such as Nalco 1782 is added at the rate of about one third pound per ton of solids recovered, most of it being added in the centrifuge, the small portion added to the feed to secondary settling tank 18 being roughly proportional to the much lower solids recovery rate in the tank than in the centrifuge.

By way of comparison, the same flotation tailings have been treated by the prior art process mentioned above, in which flocculant was added to the primary stage clarifier to reduce the solids content of the primary clarifier overflow to about 0.001%, there being no secondary clarification of the non-circulated overflow portion. In order to recover in the centrifuge substantially all the solids settled by floccing in the primary clarifier it was found necessary to add in the centrifuge approximately the same amount of flocculant as was added in the primary clarifier. The flocculant used was Narelco 1782. The total flocculant required for both the primary clarifier and centrifuge additions varied from about ⅔ pound to slightly under one pound per ton of solids recoverd, depending on whether the weather was hot or cold, the clarifier being located outdoors. The amount of flocculant required was thus about 2 to 3 times that of the example, the flocculant currently costing about $1.60 per pound, the indicated saving being about 80¢ to $1.07 per ton of solids recovered.

In the process of the example, the amount of solids recovery is essentially the same as in the prior process, even though a large part of the primary overflow or effluent is recirculated without complete solids removal from it. This is because the recirculated overflow portion returns to the process and can be maintained at substantially uniform solids concentration of the order stated and without appreciable solids buildup, despite the lack of treatment with flocculant. Of course, if the recirculated overflow portion is not returned to the feed source but is used elsewhere in the plant where its solids content is not recovered, the solids recovery loss as compared with the prior process will be about 0.001 to 0.002 times the g.p.m. primary recirculation rate. This will adversely affect the economics of my process to some extent if the solids recovered therein are useable and not discarded.

It should be understood that the drawing shows only a preferred flow sheet for carrying out the process of the invention and that various departures may be made therefrom while still retaining major advantages of the invention. For example, either or both of the settling tank type of clarifiers illustrated as the primary stage clarifier 10 and secondary stage clarifier 18 may be of other type such as centrifuges. The centrifuge overflow or effluent may be returned to the primary stage clarifier or recirculated with the primary stage effluent or otherwise used or disposed of, depending on its degree of clarity and plant requirements. Other variations are also permissible within the scope of the invention.

I claim:

1. A process for separating solids from a liquid suspension thereof which comprises the steps of treating said suspension in a primary stage separator to produce an overflow containing substantially only a fraction of the solids which does not interfere with recirculation and re-use of the overflow and which would require addition of chemical for its separation, and to produce an underflow containing the rest of the solids of said slurry, recirculating for re-use a major portion of said overflow from said primary stage separator, feeding another portion of said overflow from said primary stage separator to a second separator and adding thereto a chemical effective to cause substantially complete separation of the solid content thereof from the overflow of said second separator into the underflow thereof, feeding said underflows from said primary stage separator and said second separator to a centrifuge and adding thereto a chemical effective to cause in the centrifuge substantially complete separation of the solid content thereof from the effluent discharge into the solids discharge of said centrifuge.

2. The process of claim 1 wherein said centrifuge is of the solid bowl continuous type and said chemical is added to the feed thereto after it has entered the centrifuge bowl.

3. The process of claim 1 wherein said chemical is a polyelectrolyte flocculant.

4. The process of claim 1 wherein the underflow from said primary stage separator is heated at least to room temperature before it is fed to said centrifuge.

5. The process of claim 1 wherein the underflow from said primary stage separator is heated at least to about 100° to 150° F. before it is fed to said centrifuge.

6. The process of claim 1 wherein said second separator is located close to said centrifuge and has its underflow outlet arranged for gravity flow therefrom to said centrifuge to minimize frictional and shear forces in said underflow as it is fed to said centrifuge.

7. The process of claim 1 wherein the solid content of the overflow from said primary stage separator is about 0.1 to 0.2 percent and the solid content of the overflow from said second separator does not substantially exceed 0.001 percent.

8. The process of claim 1 wherein said primary stage separator is a large settling tank classifier located outdoors and said second separator is a small settling tank classifier located indoors.

References Cited

UNITED STATES PATENTS

| | | | |
|---|---|---|---|
| 1,839,941 | 1/1932 | Zelezniak | 210—210 X |
| 2,228,017 | 1/1941 | Pecker | 210—73 X |
| 2,864,765 | 12/1958 | Stoneman et al. | 210—70 X |
| 3,220,945 | 11/1965 | Torpey | 210—259 X |
| 3,248,323 | 4/1966 | Albertson | 210—259 X |

REUBEN FRIEDMAN, *Primary Examiner.*

J. ADEE, *Assistant Examiner.*